(12) United States Patent
Mann et al.

(10) Patent No.: US 9,296,655 B2
(45) Date of Patent: Mar. 29, 2016

(54) CONSTRUCTION MATERIAL COMPOSITION

(75) Inventors: Karl-Jürgen Mann, Vienna (AT); Martin Kozich, Vienna (AT); Marnik Michel Wastyn, Schwechat (AT)

(73) Assignee: AGRANA STÄRKE GMBH, Gmünd (AU)

( * ) Notice: Subject to any disclaimer, the term of this patent is extended or adjusted under 35 U.S.C. 154(b) by 967 days.

(21) Appl. No.: 12/743,868

(22) PCT Filed: Nov. 6, 2008

(86) PCT No.: PCT/AT2008/000401
§ 371 (c)(1),
(2), (4) Date: May 20, 2010

(87) PCT Pub. No.: WO2009/065159
PCT Pub. Date: May 28, 2009

(65) Prior Publication Data
US 2010/0258037 A1     Oct. 14, 2010

(30) Foreign Application Priority Data
Nov. 20, 2007   (AT) ................ A 1880/2007

(51) Int. Cl.
| | | |
|---|---|---|
| *C09J 103/04* | (2006.01) | |
| *C08B 31/00* | (2006.01) | |
| *C04B 16/00* | (2006.01) | |
| *C04B 24/38* | (2006.01) | |
| *C04B 28/02* | (2006.01) | |
| *C08B 31/12* | (2006.01) | |
| *C08L 3/04* | (2006.01) | |
| *C08L 3/06* | (2006.01) | |
| *C08L 3/08* | (2006.01) | |
| *C04B 111/00* | (2006.01) | |

(52) U.S. Cl.
CPC ............... *C04B 24/383* (2013.01); *C04B 28/02* (2013.01); *C08B 31/006* (2013.01); *C08B 31/12* (2013.01); *C08L 3/04* (2013.01); *C08L 3/06* (2013.01); *C08L 3/08* (2013.01); *C09J 103/04* (2013.01); *C04B 2111/00672* (2013.01)

(58) Field of Classification Search
CPC ........ C04B 24/26; C04B 24/383; C04B 28/02
USPC ................ 106/206.1, 804; 536/106
IPC ............ C09J 103/04; C04B 16/00; C08B 31/00
See application file for complete search history.

(56) References Cited

U.S. PATENT DOCUMENTS

| | | | |
|---|---|---|---|
| 2,944,913 A * | 7/1960 | Commerford et al. ... | 106/205.01 |
| 4,093,798 A | 6/1978 | Tessler | |
| 4,112,222 A | 9/1978 | Jarowenko | |
| 5,575,840 A | 11/1996 | DeWacker | |
| 6,596,860 B1 | 7/2003 | Kesselmans et al. | |
| 6,767,430 B1 * | 7/2004 | Wielema et al. ............. | 162/175 |
| 6,943,247 B2 | 9/2005 | Kiesewetter et al. | |
| 7,160,420 B2 | 1/2007 | Helbling et al. | |
| 2004/0011487 A1 | 1/2004 | Helbling et al. | |
| 2004/0158056 A1 | 8/2004 | Hiemstra et al. | |
| 2006/0037515 A1 * | 2/2006 | Tagge et al. ............. | 106/163.01 |
| 2007/0221098 A1 | 9/2007 | Wolbers et al. | |
| 2008/0255276 A1 | 10/2008 | Jetzinger et al. | |

FOREIGN PATENT DOCUMENTS

| | | |
|---|---|---|
| CN | 1505641 A | 6/2004 |
| EP | 0816299 A1 | 1/1998 |
| EP | 0824093 A1 | 2/1998 |
| EP | 0990687 A2 | 4/2000 |
| EP | 1176254 A1 | 1/2002 |
| EP | 1840098 A2 | 10/2007 |
| GB | 1515036 A | 6/1978 |
| RU | 2275342 C2 | 4/2006 |
| WO | 0005319 A1 | 2/2000 |
| WO | 02088188 A1 | 11/2002 |
| WO | 02088271 A1 | 11/2002 |
| WO | 2007041732 A2 | 4/2007 |

* cited by examiner

*Primary Examiner* — Jun Li
(74) *Attorney, Agent, or Firm* — Norton Rose Fulbright US LLP

(57) ABSTRACT

A construction material composition includes a cross-linked starch derivative of a starch that is rich in amylopectin and has an amylopectin content greater than 85%.

17 Claims, No Drawings

CONSTRUCTION MATERIAL COMPOSITION

BACKGROUND OF THE INVENTION

Field of the Invention

The present invention relates to an additive based on starch for use in construction material compositions.

The catalog of requirements for construction material compositions such as construction and tile adhesives according to EN12004 comprises, among other things, wetting capability (open time), slip and setting time. To adjust these minimum requirements and to achieve further improved properties and processing conditions, addition of water-soluble or water-swellable additives based on selected derivatives of natural substances and/or synthetic polymer compounds is known. Multicomponent mixtures based on cellulose ethers, starch ethers and/or synthetic polymer compounds in particular are routinely used. Adding small quantities of such additives or additive mixtures—usually less than 1% by weight of dry matter, based on the dry mortar mass—can already result in a noticeable delay of skin formation and hence prolongation of the open time (the workability time of tile adhesive mortars after screeding until skin formation starts, and hence a reduced wettability of the laid tiles), in increased slip resistance and in a significant delay of the initial set. All properties mentioned can essentially be attributed to specially modified starch ethers, which are typically hydroxypropyl starches based on potato starch or corn starch.

In EP 0530768 A, an additive mixture is described, which effects an improvement of the stability and working properties and increased thickening. This mixture comprises starch ethers, among them hydroxypropyl, carboxymethyl and hydroxypropyl carboxymethyl starch having a defined degree of derivatization.

In German Patent DE 102004030921 A, a mineral adhesive system, a thin-bed mortar, is described, in which starch ethers are also used in combination with methylcellulose to improve the workability. Here, it is mentioned that thin-bed mortars for grouting wall joints are also referred to as adhesives (construction adhesives).

In EP 1264808 A, guar ethers used in adhesive mortars as additive to increase stability and as processing aid are described. Hydroxypropylated and hydroxyethylated guar derivatives in particular are described, which with high stability also impart good wettability and adjustability. These properties are achieved with high degrees of substitution.

In German Patent DE 10013577, an additive mixture comprising among other things also starch derivatives is described. They are hydroxyalkylated, carboxyalkylated, alkylated or cationized starch ethers, and starch esters—that is singly modified starch ethers.

In EP0773198, a thickener system comprising cellulose ethers, starch ethers and sheet silicates is described. From the series of commercial starch products (hydroxypropyl, hydroxyethyl and carboxymethyl starch ethers), hydroxypropyl starch ethers are specified as particularly suitable. To prolong the open time, a retarding agent is added.

In U.S. Pat. No. 5,575,840, a mixture of cellulose ether and an unmodified, cold water-soluble waxy corn starch is described, the starch being supposed to replace a portion of the expensive cellulose ether without affecting the water retention value. Further modifications or properties are not discussed.

In U.S. Pat. No. 4,654,085, mixed starch ethers from the group of hydroxyalkylalkyl starches, such as for example hydroxypropylmethyl starch, and hydroxyalkyl starches, in particular however hydroxypropyl starches such as Amylotex 8100, which improve slip resistance and prolong the open time, are described. The improvement of the mortar properties is at the expense of the setting behavior. A longer open time correlates with a delayed initial set of the described cementitious tile adhesive and vice versa.

In EP 0816299 A, a starch ether and/or ester is claimed as construction material additive, where because of the selected raw material (amylopectin potato starch) no cross-linking is carried out, and better properties than with previous starch ethers based on potato and corn starch are achieved.

In EP 1840098 A, methyl starch ethers for construction material mixtures are claimed, which are additionally hydroxyalkylated, and which among other uses are also used in tile adhesives. According to the stated test results, such products only have advantages compared to commercial starch derivatives with regard to setting behavior and adhesive strength. From the given data, a shortening of the open time is also apparent. This is therefore in accordance with the effect described in U.S. Pat. No. 4,654,085 that an earlier initial set correlates with a shortening of the open time.

In "Eigenschaften von Stärkeether: Vergleich der Calciumione-nempfindlichkeit kommerzieller Produkte" ("Properties of starch ether: comparison of the calcium ion sensitivity of commercial products") (GdCh-Monographie, GdCh-Bauchemie-Tagung 2005, p. 63-69) commercially available starch ethers for tile adhesive applications are mentioned. These products are predominantly hydroxypropyl starches, hydroxypropyl carboxymethyl starches, also partially cross-linked, and carboxymethyl starches. All products have in common that they are based on either potato starch or corn starch.

BRIEF SUMMARY OF THE INVENTION

It is therefore known that starch ethers can cause prolongation of the open time, which is however accompanied by a setting delay. As is known, with a shorter setting delay the open time is also shortened. The object of the present invention is therefore to provide an additive for construction material compositions, which both significantly reduces the setting delay and causes a prolongation of the open time and at the same time ensures other important properties, such as thickener effect and slip resistance.

Subject matter of the present invention is a construction material composition comprising a cross-linked starch derivative of a starch rich in amylopectin having an amylopectin content of greater than 85%. When using the starch derivative according to the invention, prolongation of the workability time (open time) by inhibiting premature skin formation on the thin-bed mortar layer in conjunction with a short setting time while simultaneously guaranteeing the best application properties such as slip resistance and thickener effect are achieved.

Within the scope of the present invention, construction material compositions are preferably mineral-bound or dispersion-bound compositions, such as hand-applied and machine-applied plasters for example on the basis of gypsum, hydrated lime or cement, mortars, in particular thin-bed mortars, tile adhesives, gunned concrete, floor leveling compounds, cement and lime sand brick extrudates, joint fillers and putties. Particularly preferably they are cementitious, gypseous and lime-containing compositions of the type previously mentioned, most preferably construction and tile adhesives. The main field of application of the additive according to the invention is cement mortars, in particular hydraulically hardening thin-bed mortars for fixing or laying ceramic or plastic coverings using the thin-bed method, and cementitious construction adhesives. The starch modified according to the invention (by cross-linking or substitutions such as etherification or esterification) effects improved production conditions and mortar properties of for example tile adhesives according to requirements as described in EN12004.

Through specific modification of the starch raw material used (corn or potato starch rich in amylopectin) by means of cross-linking and etherification/esterification, the working properties of construction material compositions can be improved. These improvements are, among others, increased slip resistance, prolongation of the open time, reduced adherence to the tool and a more flexible mortar. It has become apparent now that amylopectin starches, for example on the basis of tuber or cereal, show a surprising property in a defined substitution window. The starch modified according to the invention is cross-linked and is preferably further modified one more time. It is characterized in that it has in contrast to current products a very short setting delay (setting time) while other properties such as open time, slip resistance and thickener effect are simultaneously preserved. To date, from practical experience it is only known that to achieve a reduction of the setting delay one also has to accept a shorter open time. This could be improved by use of starch derivatives cross-linked according to the invention. Moreover, these products also have other advantageous working properties and are characterized by particularly good stability and partly also by an excellent thickener effect.

Consequently, according to the invention it is possible to improve the working properties of cement mortars, in particular of hydraulically hardening thin-bed mortars, for laying ceramic or plastic coverings (thermal insulation composite system) and of cementitious construction adhesives for grouting wall joints among other things. The starch derivative according to the invention can be used in combination with other additives such as cellulose ethers, redispersible powders and/or accelerators.

Hydraulic binders are inorganic binders based on cement, lime and gypsum. Lately, they have been frequently used in a mixture with organic polymer binders. For practical applications, these organic polymer binders are present in the form of aqueous emulsions or dispersions. In certain cases they can also be used as sole binders.

Starch is a plant-derived natural product and essentially constitutes a glucose polymer. Depending on the original plant a starch comprises a quantitatively different composition of two ingredients, which are amylose and amylopectin. Amylose generally forms the rather lower molecular portion and mainly consists of alpha-1,4-linked glucose units. However, it also has a lower number of branching points with rather short side chains. Amylopectin is of significantly higher molecular weight and besides a stronger alpha-1,6 branching also has longer side chains.

Starches of natural origin normally have an amylose content of 20% to 30%, depending on the plant species from which they are obtained. However, there are also starches rich in amylopectin having significantly increased amylopectin content, or products comprising increased amylose content. Besides the starch types rich in amylopectin and high amylose types obtained from natural sources or by breeding measures there are also starches rich in amylopectin obtained through chemical and/or physical fractionation or produced via genetically modified plants, which are obtained, among others, by suppressing amylose production. Cereal starches rich in amylopectin on the basis of corn starch (waxy corn starch), rice starch, wheat starch and barley starch are known. Potato starch rich in amylopectin and tapioca starch rich in amylopectin are innovations in the field of starches rich in amylopectin. The field of application of these starches rich in amylopectin is predominantly in the food sector. Due to their higher cost, so far they have only become prevalent in a few technical applications.

In the literature, numerous methods are described with the help of which the amylose content of starch can be reduced by chemical means. However, in these methods for reducing the amylose content treatment at elevated temperatures (normally at greater than 140° C.) is required, whereby degradation products are produced by necessity. However, such degradation products can interfere with many applications. In the construction sector for example, a significant setting delay has to be anticipated. Moreover, the fractionation method is very complex and cost-intensive, so that so far such products have not become prevalent in large-scale applications. To avoid chemical separation of amylose and amylopectin, in recent years potato plants have also been genetically modified in such a way that the starch produced by these plants has a higher amylopectin content compared to traditional potato starch. By antisense inhibition of a GBSS gene (GBSS—granule bound starch synthase) such a modification in the genome of the potato has been achieved. Starch produced by plants modified in this manner practically no longer contains amylose. This method of genetically modifying the potato was first described in WO 92/11376. A starch having a reduced amylose content relative to common starch is referred to as amylopectin starch. Besides the mentioned antisense inhibition, other molecular biological methods for modifying the potato plant with regard to the production of an amylose-reduced starch are also possible.

The starch derivative according to the invention preferably has an amylopectin content of greater than or equal to 85%, in particular greater than or equal to 88%, greater than or equal to 90%, greater than or equal to 92%, greater than or equal to 95%, greater than or equal to 97%, greater than or equal to 98% or greater than or equal to 99%.

In addition, the starch used according to the invention is the product of cross-linking and/or etherification or esterification and mixtures thereof. In this connection, the following derivatization possibilities are known individually.

Cross-linking preferably occurs by reaction with epichlorohydrin, di- or polyfunctional glycidyl ethers or esters (butanediol diglycidyl ether, polyglycerol triglycidyl ether, cyclohexanedimethanol diglycidyl ether, glycerol triglycidyl ether, neopentylglycol diglycidyl ether, pentaerythritol tetraglycidyl ether, trimethylolpropane triglycidyl ether, perhydrobisphenol diglycidyl ether), phosphorus oxychloride or trimetaphosphate salts (sodium trimetaphosphate). Cross-linking can further occur for example with adipic acid, polyphosphates, 1,3-dichloro-2-propanol, optionally in a mixture with (poly)amines, further with di- or polyepoxides, divalent or multivalent isocyanates, linear dicarboxylic acid anhydrides, adipic acid, dichloroacetic acid, divinyl sulfones, citric acid acrolein, acrolein polyphosphate for example hexametaphosphate, biphenylene, 1,3-dimethylimidazolidin-2-one (DMEU), via acetal cross-linking for example with formaldehyde, dimethylolethyleneurea aldehydes or aldehyde-liberating reagents such as for example N,N'-Dimethyl-N,N'-ethyleneurea and mixed anhydrides of carboxylic acids with di- or tribasic acids such as for example a mixed anhydride made from acetic anhydride with adipic acid. The latter and numerous variants thereof can be summarized under the concept of cross-linking with adipic acid. Further cross-linking agents known to those skilled in the art are also suitable as cross-linking reagents; the specified reagents represent only a selection of possible chemicals.

Preferably, according to the invention the starch to be derivatized can be obtained by cross-linking with a molar ratio of cross-linking reagent (V) to anhydroglucose unit (AGU) of at least 0.0002, preferably at least 0.0015 to 0.01, preferably up to 0.005 or up to 0.0045. 1 Kilogram of starch contains about 6.2 mol of anhydroglucose units.

In certain embodiments, the starch derivative has at least one further modification (besides cross-linking), in particular a substitution of hydroxyl groups of the glucose units. Such modifications are for example etherifications or esterifications. Unless otherwise defined below, the substituents comprise organic radicals having up to 20, preferably up to 15, more preferably up to 10, most preferably up to 6, carbon atoms. Below, some derivatizations are described that alone or in combination with one another can be selected for further derivatization of the starch derivatives. The type of derivatization and the raw material basis of the used starch (e.g. potato starch rich in amylopectin or corn starch rich in amylopectin) are very closely related to the particular field of application of each product.

The methods for this are known per se. In particular, modification in slurry and in paste should be mentioned here; dry derivatizations and modification via extrusion methods are also possible.

From the literature, a multiplicity of derivatives are known, the preparation of which is nicely summarized, among others, in the publication "Starch: Chemistry and Technology", R. L. Whistler, Chapter X and XVII, 1984, and in "Modified Starches: Properties and Uses", edited by O. B. Wurzburg, Chapter 2-6, and 9-11, CRC Press, 1986. In general, with starch derivatives it is distinguished between starch ether and starch ester. Furthermore, it can be differentiated between non-ionic, anionic, cationic and amphoteric and also hydrophobic starch derivatives, which can be prepared both via slurry, paste, semidry or dry derivatization and via derivatization in organic solvents.

Under anionic and non-ionic modification of starch those derivatives are summarized in which the free hydroxyl groups of the starch are substituted by anionic or non-ionic groups.

In principle, anionic and non-ionic derivatization can be performed in two ways:

a) Modification occurs in such a way that esterification of the starch takes place. Inorganic or organic acids of different basicity, mostly dibasic acids, or salts thereof or esters thereof or anhydrides thereof serve as modification agent. For example, the following acids, among others (the list is only exemplary), are suitable: orthophosphoric acid, metaphosphoric acid, polyphosphoric acid, various sulfuric acids, various silicic acids, a variety of boric acids, acetic acid, oxalic acid, succinic acid and its derivatives, glutaric acid, adipic acid, phthalic acid, citric acid, etc. Mixed esters or anhydrides can also be used. When esterifying the starch, esterification can also occur multiple times, so that for example distarch phosphoric acid esters can be prepared. Preferably, the starch used according to the invention is the product of esterification with mono-, di- or tricarboxylic acids with an alkyl chain having 1 to 30 carbon atoms or a carbamate, particularly preferably acylated, such as succinylated, octenylsuccinylated, dodecylsuccinylated or acetylated.

b) Modification occurs in such a way that etherification of the starch takes place. It is particularly preferred if the starch used according to the invention is a methyl, ethyl, hydroxyethyl, hydroxypropyl, hydroxybutyl, carboxymethyl, cyanoethyl, carbamoylethyl ether starch or a mixture thereof.

The starch is thereby for example primarily or additionally substituted with phosphate, phosphonate, sulfate, sulfonate or carboxyl groups. This is achieved for example by reaction of the starch with halogenated carboxylic acids, chlorohydroxyalkyl sulfonates or chlorohydroxyalkyl phosphonates.

Under cationic modification of starches those derivatives are summarized where by substitution a positive charge is introduced into the starch. The cationization method occurs with amino, imino, ammonium, sulfonium or phosphonium groups. Methods for the preparation of cationized starches are described for example by D. B. Solareck: Cationic Starches, in the book by O. B. Wurzburg (Ed.): Modified Starches: Properties and Uses, CRC Press Inc., Boca Raton, Fla. (1986), p. 113-130. Such cationic derivatives preferably comprise nitrogen-containing groups, in particular primary, secondary, tertiary and quaternary amines or sulfonium and phosphonium groups bound via ether or ester linkages. The use of cationized starches comprising tertiary and electropositively charged quaternary ammonium groups is preferred.

Amphoteric starches represent another group. They comprise both anionic and cationic groups, as a result of which their application possibilities are very specific. They are mostly cationic starches that are additionally modified either by phosphate groups are by xanthates. A description of the preparation of such products is also given by D. B. Solareck: Cationic Starches, in the book by O. B. Wurzburg (Ed.): Modified Starches: Properties and Uses, CRC Press Inc., Boca Raton, Fla. (1986), p. 113-130.

As a preferred derivatization, repeated etherification and/or esterification occur. Here, alkylations, alkoxylations and carboxyalkylations are particularly preferred. It is distinguished between simple starch esters and mixed starch esters; the substituent(s) of the ester can be different: in the ester radical RCOO— the radical R can be an alkyl, aryl, alkenyl, alkaryl or aralkyl radical having 1 to 20 carbon atoms, preferably 1 to 17 carbon atoms, more preferably having 1 to 6 carbon atoms. These products include the derivatives acetate (produced from vinyl acetate or acetic anhydride), propionate, butyrate, stearate, phthalate, succinate, oleate, maleate, fumarate and benzoate.

Etherifications largely occur by reaction with alkylene oxides (hydroxyalkylation) comprising 1 to 20 carbon atoms, preferably 2 to 6 carbon atoms, most preferably 2 to 4 carbon atoms, in particular using ethylene and propylene oxide. However, methyl, carboxymethyl, cyanoethyl and carbamoyl ethers can also be prepared and used. As example for a carboxyalkylation, the reaction of starch with monochloroacetic acid or salts thereof can be mentioned. Furthermore, hydrophobing etherification reagents, such as glycidyl ether or epoxides, in particular should also be mentioned. The alkyl chain length of the mentioned reagents is between 1 and 20 carbon atoms; in addition, aromatic glycidyl ethers are also important.

Examples for a derivatization with glycidyl ethers are ocresol glycidyl ether, polypropylene diglycol glycidyl ether, tert-butylphenyl glycidyl ether, ethylhexyl glycidyl ether, hexanediol glycidyl ether and neodecanoic acid glycidyl ester.

A further possibility of alkylation consists in alkylation via alkyl halides, for example via methyl chloride, dialkyl carbonate, e.g. dimethyl carbonate (DMC), or dialkyl sulfate, e.g. dimethyl sulfate.

The degree of substitution MS (molar substitution: mol substituent/mol glucose unit) is preferably at least 0.0001, 0.001, 0.01, 0.02, 0.03, 0.04, or at least 0.05, 0.06, 0.07, 0.08 or 0.09, most preferably at least 0.1, and up to 2.0, 1.0, 0.8, 0.75, 0.7 or up to 0.6. With carboxyalkylation, in particular carboxymethylation, the carboxyalkylation degree DS (degree of substitution: mol substituent (directly bound to glucose unit)/mol glucose unit) preferably is between 0.01 and 0.25, preferably between 0.04 and 0.2.

Besides the ethers and/or esters or in addition to this derivatization the cross-linked starch used according to the invention can also be oxidized to various extent, thermochemically degraded, dextrinated or extruded.

In addition, the starches used for the esterifications, etherifications and cross-linkings can be tempered (in slurry) or inhibited (dry or semidry reaction) through thermophysical modifications.

Starches can also be modified by means of hydrophobing reagents. Etherified hydrophobic starches are obtained if the hydrophobic reagents contain as functional group a halide, epoxide, glycidyl, halohydrin, carboxylic acid or a quarternary ammonium group. For esterified hydrophobic starches, the hydrophobic reagent contains in most cases an anhydride. The specified reactions can also proceed in the presence of a surfactant. Hydrophobing of the starch can also occur through mixing of a starch or a starch derivative with fatty acid ester. According to the invention, the starch derivative is hydrophobed, in particular with a degree of derivatization of the hydrophobing as specified above for substitution, preferably between MS of 0.01 to 0.1. All mentioned modifications of starch can not only be achieved by reaction of native starch but also with use of degraded forms. The degradation processes can occur in a mechanical, thermal, thermochemical or enzymatic way. The starch can thereby not only be structurally modified; starch products can also be made cold water-soluble or cold water-swellable (e.g. dextrination and extrusion).

Finally, the starch can also be present as graft polymer or graft copolymer, such as for example with products from the group of polyvinyl alcohols, acrylamides or monomers or polymers based on hydrocarbons. Here, the starch graft (co) polymer can preferably be present as emulsion polymer.

In the construction material industry, particularly in the dry mortar sector, apart from special applications such as the use of highly cross-linked cooking starch, cold-water soluble starch derivatives are predominantly used. Here, the production methods used are known as well. They are, among others, gelatinization and drum drying in a thin film or extrusion. In drum drying, through the effect of temperature and shear forces either the granular starch itself is broken down or an already broken down paste is dried. In both cases, drum drying causes a breakdown of the native starch structures. For optimum development of the properties of starch derivatives for the construction sector, the right breakdown degree is of great importance. In this connection, extrusion is a special method. Here, the possibility to break down modified starch to various degrees by physical effects and simultaneously react it to a cold water-soluble or cold water-swellable product presents itself. In addition, with this technology the direct chemical derivatization of starch can be performed in a cost-saving manner.

Characterization of the starch derivatives occurs through the methods given below:

The viscosity is determined by a Brookfield measurement. For this, a 5% paste (in dry matter) is prepared with the cold water-soluble starch derivative, the water being introduced first and the finely ground powder being added while stirring with a turbine agitator at 1000 rpm. Once the sample has been introduced, stirring is continued for another 10 minutes at 1500 rpm, and subsequently the viscosity is measured using a Brookfield rotational viscosimeter at 20° C. and a rotational speed of the spindle of 100 rpm.

The pure starch derivative used according to the invention has a 5% aqueous Brookfield viscosity of 1000-10000 mPas at 100 rpm and 20° C., preferably 2000-7000 mPas.

The degree of cross-linking of starches can be determined independent of the type of cross-linking reagent in a simple manner via the molecularly dispersed portion.

To determine the substitution degrees for example of the hydroxyalkylation of starch ethers, the modified starch is reacted with hot, concentrated hydriodic acid (Zeisel cleavage), and the alkyl iodides and alkylenes being formed are separated and analyzed by gas chromatography. In products cross-linked using epichlorohydrin, the degree of cross-linking can also be determined by this method. Determination of the carboxymethylation degree occurs by acid catalytic cleavage of the polysaccharide and subsequent liquid chromatography determination. The degree of substitution with glycidyl ethers and other rather hydrophobic reagents and all other derivatizations can additionally also be determined by means of NMR.

In a further aspect the present invention relates to the use of the starch derivative according to the invention in a construction material composition, in particular in cementitious and/or dispersion-modified construction adhesives, preferably in a tile adhesive, in particular for laying ceramic coverings or in thermal insulation composite systems. The starch derivative according to the invention can replace part of the cellulose ethers typically functioning as thickener and water retention agent, such as methylcelluloses (MC), ethylcelluloses (EC), hydroxypropylmethylcelluloses (MHPC), hydroxyethylmethylcelluloses (MHEC), hydroxypropylcelluloses (HPC), hydroxyethylcelluloses (HEC), in the mentioned applications, in particular in tile adhesives, and thus improve the properties of the overall system. In known formulations, up to 45% of cellulose ether are replaced by starch ether, the cellulose derivative being used up to a quantity of 0.8% based on the total dry mortar quantity ("Recent Developments in Dry Mortar Technology in Europe" (Technical Bulletin 01: South East Asia Drymix Mortar Association, p. 12, Table 7, and Dry-mix Mortar Yearbook 2007, p. 22, FIG. 4, and Ullmann's Encyclopedia of Industrial Chemistry 2002, Dry Mortars, Bayer R. and Lutz H.). The starch ether according to the invention is preferably present in quantities of 0.001 to 0.4% by weight, based on the total dry mass in the construction material composition.

Furthermore, the construction material compositions can also comprise additives and/or modification agents. They can be for example hydrocolloids, redispersible plastic powders, antifoaming agents, swelling agents, fillers, light-weight additives, polyacrylates, polyacrylamides, hydrophobing agents, air-entraining additives, synthetic thickeners, dispersing aids, plasticizers, retarding agents, accelerators or stabilizers. Furthermore, fillers such as silica sand, dolomite, sand-lime, calcium sulfate dihydrate are also suitable as additives and/or modification agents.

The starch derivative according to the invention can be formulated in dry form with the other additives to a so-called dry mortar and thus specifically adapted to each application. Below, the present invention is explained using exemplary embodiments without being limited to same embodiments.

EXAMPLES

Example 1

Starch Ether SE4, Preparation of a Cross-Linked Hydroxypropyl Starch Ether 1 kg of native waxy corn starch (6 mol) is mixed in a concentration of 35% as slurry, and this slurry is transferred into a pressure reactor. Here, a catalytic amount of NaOH (5 g, 0.125 mol) is added now, so that the starch, however, does not yet gelatinizes at room temperature. After purging the headspace of the reactor with nitrogen a cross-linking reagent, e.g. epichlorohydrin (1 g, 0.01 mol-V/AGU=0.0018), and an etherification reagent, e.g. propylene oxide (0.6 kg, 10.3 mol–$MS_{theoretical}$=1.5) are added. Now, the reactor is closed, excess pressure of 5 bar is applied, and the reaction vessel is heated to 110° C. The reaction is then carried out at this temperature for 3 h. Afterwards, side products or unreacted reagent are removed by passing steam through, and the product is neutralized with sulfuric acid. The paste product now present is dried by drum drying and finely ground.

Example 2

Tile Adhesive

Below, a very simple, but representative tile adhesive recipe (Recipe 1) on the basis of "Recent Developments in Dry Mortar Technology in Europe" (Technical Bulletin 01: South East Asia Drymix Mortar Association, p. 12, Table 7) and US2007/0221098A1 is shown, with which further tests were performed. However, the results can also be carried over to other systems. The tests occurred at an ambient temperature of 23±2° C. and a relative humidity of 50±5%.

TABLE 1

| Recipe 1 | |
|---|---|
| 35% | CEM I 42.5 R Milke Classic |
| 64.60% | Silica sand |
| 0.35% | Cellulose ether (MHPC) |
| 0.05% | Starch ether (13% of CE) |

The individual components are mixed by hand in dry form with the additives and shaken in a closed receptacle (plastic container with lid). The respective amount of water is introduced into a rubber bowl and the dry material is added over the course of 15 sec and stirred in using a commercial handheld kitchen mixer with dough hooks: Stirring for 10 sec on speed 1, then 60 sec on speed 2. After a maturing time of 5 min it is stirred for another 15 sec on speed 1. The mortars prepared in this manner were characterized using the testing methods specified below.

After stir-in, the viscosity measurement using a Helipath spindle system takes place immediately. For better comparability of the results of the measurements the same consistency is adjusted, defined as a mortar viscosity of about 500 Pa·s at 5 rpm. Adjusting this consistency occurs through the amount of water (W/S water/solid content), whereby the water demand of the different starch types is also determined.

To determine the slip resistance (in accordance with EN1308) the tile adhesive was applied to a horizontal plastic sheet using a notched trowel, and after 2 min a dry stoneware tile [uniform weight per unit area of about 2 g/cm$^2$] is laid in the tile adhesive bed. The position of the tile is now marked, and the plastic sheet is arranged horizontally. After 10 min the sliding length (distance between marking and current position of the top of the tile) is determined.

In the measurement of the open time, the time is determined in which a tile can still be pressed into a tile adhesive bed applied using a notched trowel and is still at least 50% wetted after an applied load and later removal. The reduction of wetting can be equated with the onset of skin formation. The measurements occurred in accordance with the method description in German Patent DE10013577 (p. 10) or EP1840098 (p. 5 [51]). For the test, the tile adhesive was applied, and depending on the tile adhesive composition the laying of the tiles is started after a latency time. In Example Mortar, the laying is started after 20 min. For this, a 5×5 cm stoneware tile (non absorptive: water absorption<0.5%) is placed in the adhesive bed and loaded with a 2 kg weight for 30 sec. Afterwards, the tile is immediately taken out and evaluated for wetting with the adhesive. If more than 50% of the surface is wetted the next measurement is performed in a 10 minute interval. In case of wetting of less than 50% the open time is over. The relative open time in % based on the open time of the commercial product M1 (Tylovis SE7) is reported.

The setting behavior from mixing the tile adhesive through the initial set until the final set is further examined, only the final set being reported in Table 4. The setting behavior was determined through penetration of a needle into the tile adhesive [automatic Vicat needle tester]. To perform the tests, after mixing, the adhesive was transferred free of air bubbles with light stirring into a plastic cup [height of mortar layer 40 mm]. Subsequently, a wide trowel was moved without pressure in a sawing motion over the surface to make it planar, and the mortar was stored at 20° C. under water and measured. The initial set is defined as the point in time at which the penetration depth of the Vicat needle is only 36 mm; the final set is defined as the point in time at which the penetration depth is only 4 mm.

Example 3

Comparative Values

In Table 2, some starch ethers are characterized by way of example, SE1-SE10 being sample starch ethers and M1-M2 being commercially available products. M1 is Tylovis SE7, M2 is Casucol 301. SE1, SE2, SE3 and SE9 are samples according to the invention. Besides the raw material, SE1 and SE10 do not differ in their derivatization. Uncross-linked products are designated with "0" in the "cross-linking" column. Starches rich in amylopectin are designated with the abbreviation APS. The molar substitution degree with propylene oxide is designated "MS PO", the substitution degree with carboxymethyl groups is designated "DS CM".

In Table 3, the application properties in Recipe 1 are shown. With SE1, the effect of amylopectin starch (APS) already becomes apparent in the limited modification scope compared to comparative product SE10; SE1 is characterized by higher stability, longer open time and shorter setting time. However, the improved properties are limited to a narrow range with regard to the degree of derivatization, as can be seen from Examples SE1, SE2 and SE4. With the same cross-linking but different degree of propoxylation the open time shortens with SE2 and SE4, and the slip resistance is also reduced with increasing degree of propoxylation even though the final set occurs sooner. With a molecular substitution degree of 0.2 as with SE3 an improvement of the properties according to the invention occurs.

Compared to SE2, SE8 is characterized by an additional high carboxymethylation, however, this additional modification worsens the properties again. Minor carboxymethylation as in sample SE9 on the other hand shows vastly improved properties compared to uncarboxymethylated SE2.

In addition, it can be seen from the two highly carboxymethylated products SE7 and SE8 that the degree of cross-linking should be adapted to the other derivatization. For example, in this case (SE8) cross-linking is counterproductive. The final set thereby occurs indeed sooner, however, the stability is severely adversely affected by this modification. The commercially available reference samples M1 and M2 are hydroxypropyl starches based on potato starch, which are described in many patents. Both M1 (hydroxypropyl potato starch) and M2 (hydroxypropyl carboxymethyl potato starch) exhibit a noticeable setting delay and also show shortcomings with regard to slip resistance. In addition, in the comparison between M2 and a similarly modified starch rich in amylopectin it becomes apparent that changing the raw material alone does not yield an advantage. On the contrary, the reported measured values show clearly that only through a combination of amylopectin starch, cross-linking and preferably at least one further modification, preferably however two additional modifications, the thin-bed mortar properties can be improved according to the invention.

TABLE 2

Product characterization

| Starch ether | Raw material | MS PO | Viscosity 5% [mPas] | DS CM | Cross-linking |
|---|---|---|---|---|---|
| SE1 | APS | 0.4 | 2400 | 0 | Cross-linked |
| SE2 | APS | 0.5 | 2800 | 0 | Cross-linked |
| SE3 | APS | 0.2 | 2300 | 0 | Cross-linked |
| SE4 | APS | 0.8 | 3040 | 0 | Cross-linked |
| SE5 | APS | 0.5 | 390 | 0 | 0 |
| SE6 | APS | 0.2 | 1180 | 0 | Cross-linked |
| SE7 | APS | 0.5 | 380 | 0.3 | 0 |
| SE8 | APS | 0.5 | 4400 | 0.3 | Cross-linked |
| SE9 | APS | 0.4 | 5910 | 0.11 | Cross-linked |
| SE10 | CS | 0.4 | 1600 | 0 | Cross-linked |
| M1 | PS | 0.4 | 270 | 0 | 0 |
| M2 | PS | 0.2 | 450 | 0.3 | 0 |

TABLE 3

Application properties in Recipe 1

| Starch ether | W/S | Slip [mm] | Rel. open time [%] | Final set [h] |
|---|---|---|---|---|
| SE1 | 0.25 | <0.5 | 130 | 23 |
| SE2 | 0.25 | <0.5 | 110 | 18 |
| SE3 | 0.26 | <0.5 | 163 | 17.5 |
| SE4 | 0.24 | 6 | 98 | 18.5 |
| SE5 | 0.24 | <0.5 | 98 | 26.5 |
| SE6 | 0.25 | 3 | 217 | 20 |
| SE7 | 0.24 | 2 | 120 | 28 |
| SE8 | 0.26 | 20 | 120 | 24 |
| SE9 | 0.26 | <0.5 | 217 | 21.5 |
| SE10 | 0.25 | 4 | 110 | 25 |
| M1 | 0.24 | 3 | 100 | 31 |
| M2 | 0.25 | 2 | 110 | 28 |

In comparative tests of waxy starches based on different raw materials, an advantage of a particular raw material could not be found. Waxy corn starch and waxy or amylopectin potato starch showed almost identical behavior.

The invention claimed is:

1. A construction material composition, comprising: a cross-linked starch derivative of a starch rich in amylopectin with an amylopectin content of greater than 85% and with a 5% aqueous Brookfield viscosity of a pure starch derivative of 2,000 to 7,000 mPas at 100 rpm and 20° C., wherein the starch has at least one further modification besides the cross-linking and is hydroxypropylated with a degree of substitution MS of between 0.1 and 0.6.

2. The composition according to claim 1, wherein the starch is a cereal starch rich in amylopectin.

3. The composition according to claim 2, wherein the starch is a waxy corn starch or a potato starch rich in amylopectin.

4. The composition according to claim 1, wherein the starch is cross-linked with a molar ratio of a cross-linking reagent to an anhydroglucose unit of between 0.0002 and 0.005.

5. The composition according to claim 4, wherein the molar ratio of the cross-linking reagent to the anhydroglucose unit is between 0.0015 and 0.0045.

6. The composition according to claim 1, wherein the at least one further modification is an etherification or an esterification or a mixture thereof.

7. The composition according to claim 1, wherein the starch derivative is additionally carboxyalkylated with a group having 1 to 20 carbon atoms.

8. The composition according to claim 7, wherein the starch derivative is carboxymethylated.

9. The composition according to claim 7, which further comprises a carboxyalkylation degree MS of between 0.01 and 0.25.

10. The composition according to claim 9, wherein the carboxyalkylation degree MS is between 0.04 and 0.2.

11. The composition according to claim 1, wherein the starch derivative is additionally hydrophobed.

12. The composition according to claim 11, which further comprises a degree of derivatization of the hydrophobing of between MS 0.01 and 0.1.

13. The composition according to claim 1, which further comprises at least one additional additive selected from the group consisting of cellulose ether, redispersible powder, accelerator, retarding agent, plasticizer and air-entraining additive.

14. A cementitious and/or dispersion-modified construction adhesive, comprising: a composition according to claim 1.

15. The adhesive according to claim 14, wherein the adhesive is a tile adhesive.

16. The adhesive according to claim 14, wherein the adhesive is an adhesive for laying ceramic coverings.

17. The adhesive according to claim 14, wherein the adhesive is an adhesive for thermal insulation composite systems.

* * * * *